United States Patent
Chassard et al.

(10) Patent No.: US 9,948,230 B2
(45) Date of Patent: Apr. 17, 2018

(54) DEVICE FOR CONTROLLING A MOTOR VEHICLE ALTERNATOR, AND CORRESPONDING ALTERNATOR

(71) Applicant: VALEO EQUIPEMENTS ELECTRIQUES MOTEUR, Creteil (FR)

(72) Inventors: Pierre Chassard, Creteil (FR); Pierre Tisserand, Limeil Brevannes (FR); Jean-Francois Gautru, Montreuil (FR); Nathalie Canitrot, Creteil (FR); Jean-Marc Dubus, Combs la Ville (FR); Thomas Vera, Montreuil (FR); Pierre Faverolle, Montgeron (FR); Gregory Godefroy, Saint Maur des Fosses (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 15/538,944

(22) PCT Filed: Dec. 8, 2015

(86) PCT No.: PCT/FR2015/053375
§ 371 (c)(1),
(2) Date: Jun. 22, 2017

(87) PCT Pub. No.: WO2016/110619
PCT Pub. Date: Jul. 14, 2016

(65) Prior Publication Data
US 2017/0359015 A1    Dec. 14, 2017

(30) Foreign Application Priority Data

Jan. 6, 2015  (FR) ..................... 15 50063

(51) Int. Cl.
*G05B 5/00*  (2006.01)
*G05D 23/00* (2006.01)
(Continued)

(52) U.S. Cl.
CPC .............. *H02P 29/68* (2016.02); *H02P 9/305* (2013.01); *H02P 29/032* (2016.02)

(58) Field of Classification Search
CPC . G05B 5/00; G05D 23/00; H02H 7/08; H02P 1/04
(Continued)

(56) References Cited

U.S. PATENT DOCUMENTS 5,198,744 A    3/1993  Kohl et al.

FOREIGN PATENT DOCUMENTS

DE    102007012702 A1    7/2008
EP    0462503 A1    12/1991
(Continued)

*Primary Examiner* — Erick Glass
(74) *Attorney, Agent, or Firm* — Berenato & White, LLC

(57) ABSTRACT

The invention relates to a device for controlling an alternator of the type that controls a DC voltage (B+A) generated by the alternator (11) according to a predetermined set voltage ($U_0$) by monitoring the intensity of an energizing current ($I_{EXC}$) flowing through an energizing circuit of the alternator. According to the invention, the device includes a voltage-control loop (7) and a temperature-control loop (17) which comprises a temperature sensor supplying a current temperature (T) of components of the alternator, a subtracter (19) supplying a temperature error ($\epsilon_t$) between the current temperature (T) and a maximum acceptable temperature ($T_{max}$) and a control module (20) supplying a maximum admissible energizing percentage ($r_{max}$) in accordance with the temperature error according to a predetermined control law.

19 Claims, 5 Drawing Sheets

(51) Int. Cl.
- *H02H 7/08* (2006.01)
- *H02P 1/04* (2006.01)
- *H02P 29/68* (2016.01)
- H02P 9/30 (2006.01)
- H02P 29/032 (2016.01)

(58) Field of Classification Search
USPC .......................................................... 318/472
See application file for complete search history.

(56) References Cited

FOREIGN PATENT DOCUMENTS

| | | | |
|---|---|---|---|
| FR | 2802363 | A1 | 6/2001 |
| WO | WO2012032239 | A1 | 3/2012 |

DEVICE FOR CONTROLLING A MOTOR VEHICLE ALTERNATOR, AND CORRESPONDING ALTERNATOR

CROSS-REFERENCE TO RELATED APPLICATIONS AND CLAIM TO PRIORITY

This application is a national stage application of International Application No. PCT/FR2015/053375 filed Dec. 8, 2015, which claims priority to French Patent Application No. 1550063 filed Jan. 6, 2015, the disclosures of which are incorporated herein by reference and to which priority is claimed.

FIELD OF THE INVENTION

The present invention relates to a device for controlling a motor vehicle alternator. The invention also relates to the alternator comprising this control device.

BACKGROUND OF THE INVENTION

In order to face up to the increase in power which an alternator or alternator-starter of a motor vehicle must now provide because of the increased consumption by the on-board equipment, nominal on-board network voltages of approximately 42 V tend to be used instead of 14 V, in order to supply power levels of approximately 4 kW to 10 kW.

In addition, even if the nominal voltage of the on-board network remains 14 V, it may be desirable in some cases to increase the output performance of an alternator intermittently by increasing an intensity of an excitation current which circulates in a rotor of the alternator.

For this purpose, in patent application FR2802363, the company VALEO EQUIPEMENTS ELECTRIQUES MOTEUR proposes over-exciting the rotor by means of a voltage-increasing chopper circuit, from the on-board network.

A control loop makes it possible to maintain the excitation current at values which require the alternator to be permanently at a temperature lower than a maximum permissible temperature for the alternator and its components.

Another way of increasing the output performance of a standard alternator is to decrease the impedance of an excitation winding of the rotor, which has the effect of increasing the excitation current for the same nominal voltage of the on-board network.

This manner of proceeding is advantageous in a range-decreasing operation (known by the term downsizing), i.e. when it is wished to use in a vehicle of a certain category equipment of a vehicle of a lower category, by boosting its characteristics.

However, in the case of an alternator which is operating in over-speed mode, which is also known by the term boosting, the parts manufacturer clearly has the problem of thermal balancing of the machine, with the increase of the currents increasing correspondingly the losses such as the Joule losses and iron losses, for example.

SUMMARY OF THE INVENTION

The objective of the present invention is thus to solve the above-described thermal problem.

According to a first aspect, the invention relates to a device for controlling a motor vehicle alternator which controls a direct voltage generated by this alternator at a predetermined set voltage.

This direct voltage is controlled by controlling a current which circulates in an excitation current comprising an excitation winding of a rotor of the alternator.

This control device is of the type which in itself is known, which also maintains a current temperature of the components of the alternator below at least a predetermined maximum permissible temperature.

The control device of a motor vehicle alternator according to the invention comprises a control loop comprising:
means for acquisition of the direct voltage which is generated and supplies a measured voltage;
a first subtracter of this measured voltage from the set voltage, which generates an error voltage;
means for conditioning of this error voltage;
a saturation module which supplies according to the voltage error at the input an excitation percentage at the output which is limited to a maximum permissible excitation percentage;
a generator of a pulse width modulated signal which has a duty cycle equal to the excitation percentage;
a semiconductor switch which is controlled by the pulse width modulated signal controlling the intensity of the excitation current.

The control device according to the invention also comprises a temperature control loop comprising:
at least one temperature sensor which supplies at least one current temperature of the components;
at least one second subtracter of this current temperature from at least one maximum permissible temperature, which generates at least one temperature error;
a control module which supplies the maximum permissible excitation percentage according to this temperature error, in accordance with a predetermined control law.

In a first embodiment of the device for controlling a motor vehicle alternator according to the invention, the current temperature is a current casing temperature of a casing of this alternator, or a current bearing temperature of a rear bearing of this alternator, or a current junction temperature of a junction of the semiconductor switch, and the maximum permissible temperature is a predetermined maximum permissible casing temperature or a predetermined maximum permissible bearing temperature, or predetermined maximum permissible junction temperature, and the temperature sensor is a casing temperature sensor or a bearing temperature sensor, or a junction temperature sensor.

According to a second embodiment of the device for controlling an alternator of a motor vehicle according to the invention, the temperature control loop comprises:
a set of sensors formed by a plurality of first examples of this temperature sensor;
a plurality of second examples of this second subtracter, generating a series of errors formed by a plurality of third examples of this temperature error, by subtracting for com-paring) respectively elements of a set of current temperatures supplied by this set of sensors from for with) the elements of a set of maximum permissible temperatures formed by fourth examples of this maximum permissible temperature;
means for determining a maximum error from amongst this series of errors;
a selector which supplies this maximum error to the control module.

In the device for controlling an alternator of a motor vehicle according to the invention:
the set of sensors comprises at least a plurality of elements selected from amongst a first sensor of a first temperature of a stator of the alternator, a second sensor of a second temperature of a casing of the alternator, a third sensor of a third temperature of the rectifier diodes of the phase currents of the alternator, a fourth sensor of a fourth temperature of the rotor, a fifth sensor of a fifth temperature of a junction of the semiconductor switch;

the set of current temperatures comprises at least a plurality of current values selected from amongst the first, second, third, fourth and fifth temperatures;

the set of maximum permissible temperatures comprises at least a plurality of reference values selected from amongst first, second, third, fourth and fifth maximum permissible temperatures corresponding to the first, second, third, fourth and fifth temperatures.

In this second embodiment of the invention, the set voltage depends on the fifth temperature.

In both the embodiments of the invention, the means for conditioning of the voltage error comprise means for filtering and adjustment of a gain.

The voltage control loop and the temperature control loop are digital.

Also according to the invention, the control device forms a monolithic assembly which incorporates the said semiconductor switch.

According to another aspect, the invention also relates to a motor vehicle alternator comprising a control device as previously described.

These few essential specifications will have made apparent to persons skilled in the art the advantages provided by the invention in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1A:
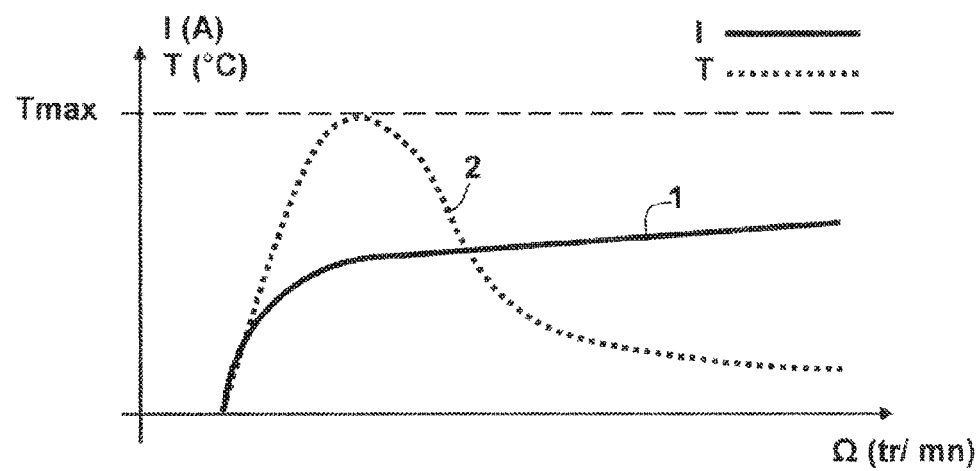
FIGS. 1a and 1b show measurements of outputs and temperatures according to a speed of rotation of alternators known in the prior art, respectively with a non-critical and critical thermal balance.

The curve in a solid line 1 in FIG. 1a represents the characteristic of an output I of an alternator according to its speed of rotation $\Omega$ for a maximum excitation (known as "full field") at a maximum ambient temperature (for example 125° C.), and at an imposed operating voltage (for example 13.5 V).

The "iron" alternator temperature T, i.e. at a point on the casing, can then be detected for different speeds of rotation $\Omega$ of the rotor at so-called "stabilised" points; the resulting curve is also shown in a broken line 2 in FIG. 1a.

An alternator which has good thermal balance has an "iron" temperature T which does not exceed the maximum permissible "iron" temperature threshold $T_{max}$. This thermal balance is then non-critical for the aforementioned operating conditions.

Figure 1B:
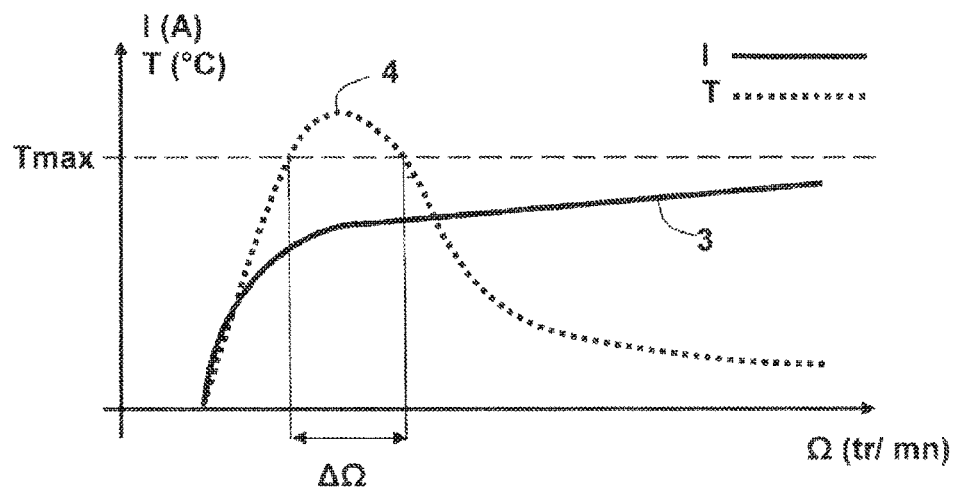

In the case of a machine wherein the output performance I is increased (boosted alternator) as shown by the other curve in a solid line 3 in FIG. 1b, by decreasing the impedance of an excitation winding of the rotor for example, which has the effect of increasing an excitation current, the "iron" temperature T exceeds the maximum permissible temperature threshold $T_{max}$ in the aforementioned operating conditions over a speed range $\Delta\Omega$ known as "temperature-critical", as also shown by the other curve in a broken line 4.

In these conditions, the means for cooling the alternator cannot discharge the heat because of the various losses.

The thermal balance of the machine is then considered to be interrupted. An excessively long duration of operation of the alternator in the speed range which is critical in terms of temperature $\Delta\Omega$ can give rise to destruction of the machine as a result of an excessive temperature.

Figure 2:
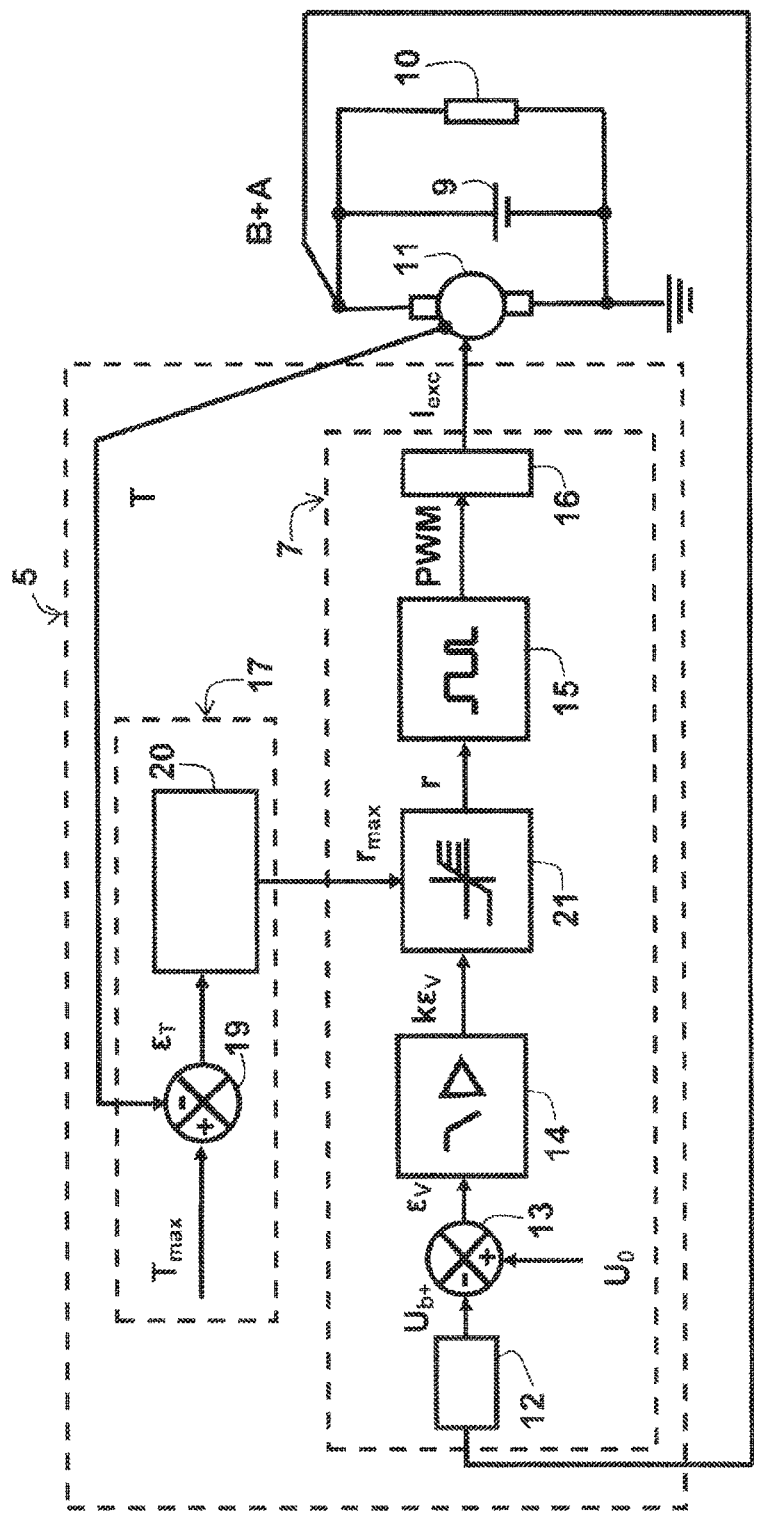
FIG. 2 is a process diagram of a device for controlling a motor vehicle alternator according to a first preferred embodiment of the invention.
Figure 5:
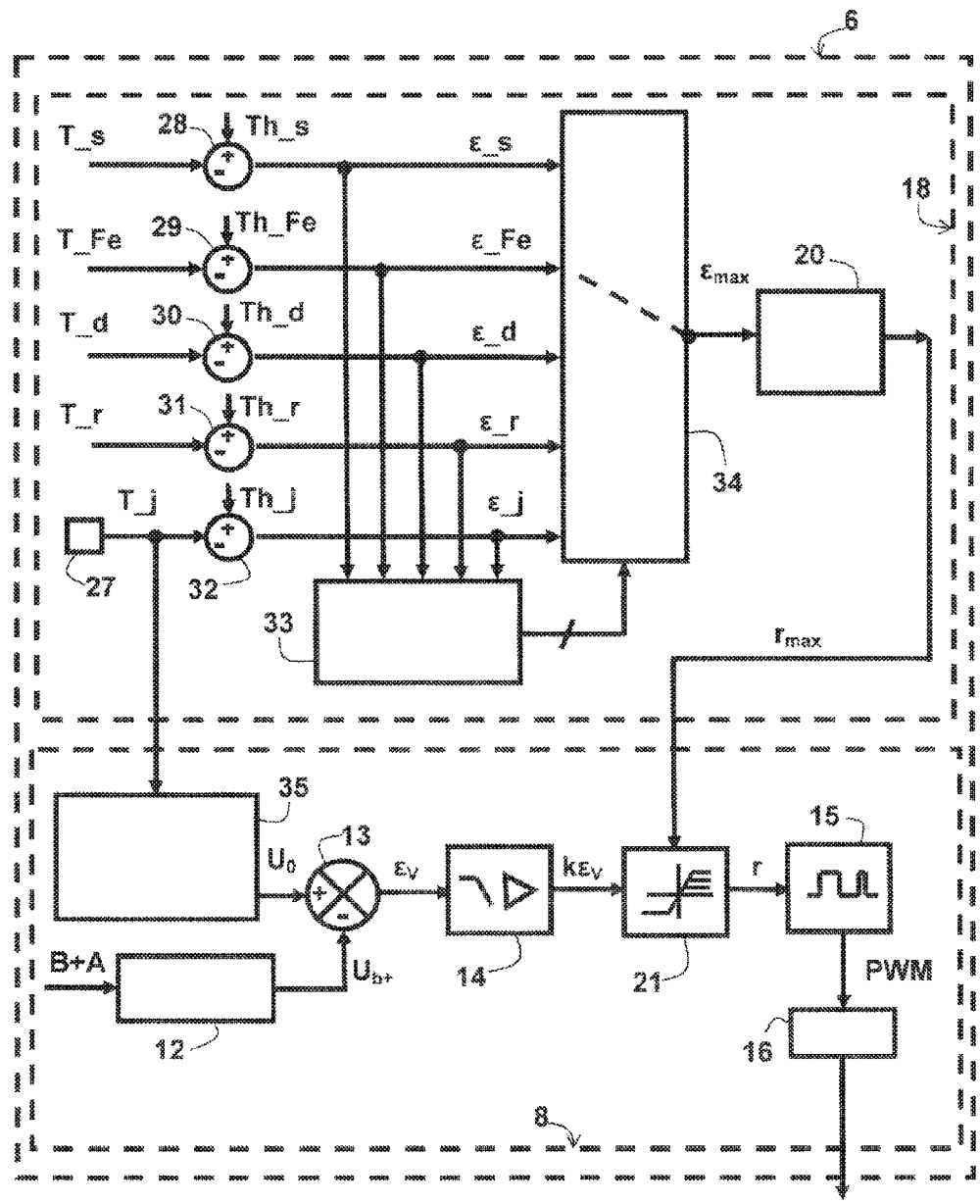
FIG. 5 is a process diagram of a device for controlling a motor vehicle alternator according to a second preferred embodiment of the invention.

The device 5, 6 for controlling alternator according to the invention, the process diagrams of the first and second preferred embodiments of which are given respectively in FIGS. 2 and 5, relates substantially to the problem of thermal stability of a boosted alternator.

In order to solve the thermal problem of the alternator, a solution proposed by the inventive body is use of the regulator 5, 6 in order to control at least one current temperature T of the alternator by means of at least one sensor placed on at least some components of the alternator (for example the iron of a stator, or on a rear bearing of the machine, in order to measure temperatures of the diodes).

In a known manner, this regulator 5, 6 comprises a voltage control loop 7, 8 which makes it possible to subject to a set voltage $U_0$ a direct voltage B+A of an on-board network of the vehicle, comprising in general a battery 9 and various items of equipment 10, supplied with power by the alternator 11.

Conventionally, this voltage control loop 7, 8 comprises:

means 12 for acquisition of the direct voltage B+A taken on a positive terminal of the alternator 11 which supplies a measured voltage $U_{b+}$;

a first subtracter 13 of the measured voltage $U_{b+}$ from the set voltage $U_0$, thus generating an error voltage $\epsilon_v$;

means 14 for conditioning of this error voltage $\epsilon_v$ by filtering and adaptation of gain k;

a generator 15 of a pulse width modulated signal PMW with a duty cycle r equal to an excitation percentage which depends on the voltage error $\epsilon_v$, and controls a semiconductor switch 16 which controls the intensity of excitation $I_{exc}$.

According to the invention, the regulator 5, 6 also comprises a temperature control loop 17, 18.

In the first preferred embodiment, the process diagram of which is represented in FIG. 2, this temperature control loop 17 comprises a temperature sensor which supplies the current temperature T of one of the components of the alternator 11.

This can be a sensor outside the regulator 5, placed on the iron of the stator or on the rear bearing, in order to measure the temperature of the diodes, or alternatively a sensor inside the regulator 5, which measures a junction temperature of the semiconductor switch 16.

A second subtracter 19 of the current temperature T from a predetermined maximum permissible temperature $T_{max}$ generates a temperature error $\epsilon_T$ starting from which a control module 20 supplies the voltage control loop 7 with a maximum permissible excitation percentage $r_{max}$ which makes it possible to maintain the current temperature T of the alternator 11 below the predetermined maximum permissible temperature $T_{max}$, whilst ensuring voltage regulation.

Figure 3A:
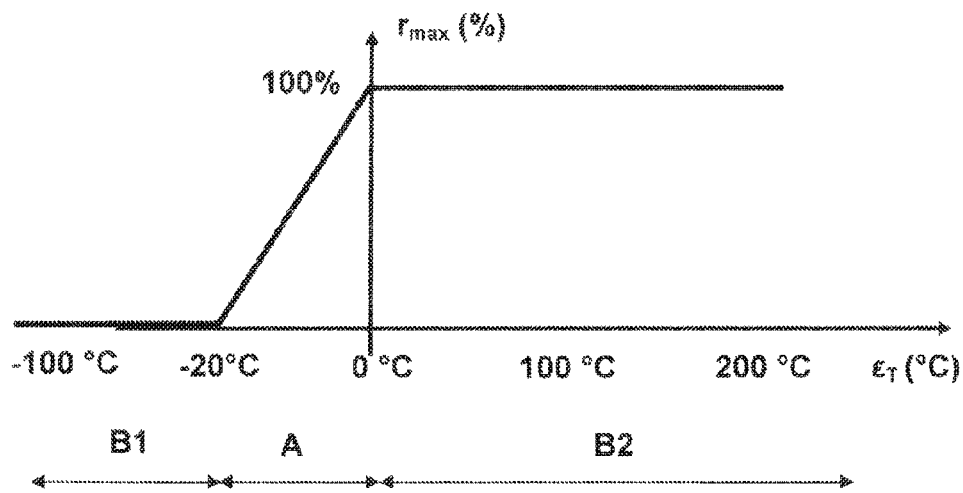
FIGS. 3a and 3b are respectively a graph representing a control law defining a permissible excitation percentage, and another graph representing a saturation function derived from this control law.

An example of the control law which defines the maximum permissible excitation percentage $r_{max}$ according to the temperature error $\epsilon_T$ is represented in FIG. 3a.

In this example, in a linear area A, a maximum permissible excitation percentage $r_{max}$ gradient according to the error temperature $\epsilon_T$ is approximately −5%/° C.

In the linear area A, the gradient can be adapted in order to obtain a temperature regulation loop gain which is more or less high, according to a required limited temperature precision.

In another area B1 of the control law, where the temperature error $\epsilon_T$ is between −100° C. and −20° C., the alternator 11 is at a current temperature T which is very much higher than the predetermined maximum permissible temperature $T_{max}$, and the excitation is cut off (maximum permissible excitation percentage $r_{max}$ zero).

If the temperature error $\epsilon_T$ is positive (area B2 of the control law), the current temperature T, which is very much lower than the predetermined maximum permissible temperature $T_{max}$, and the excitation, depend only on the voltage control loop 7 (maximum permissible excitation percentage $r_{max}$ of 100%).

The maximum permissible excitation percentage $r_{max}$ supplied by the control module 20 is applied to a saturation module 21 inserted in series in the voltage control loop 7, between the means 14 for conditioning of the voltage error $\epsilon_V$ and the generator of the pulse width modulated signal 15.

Figure 3B:
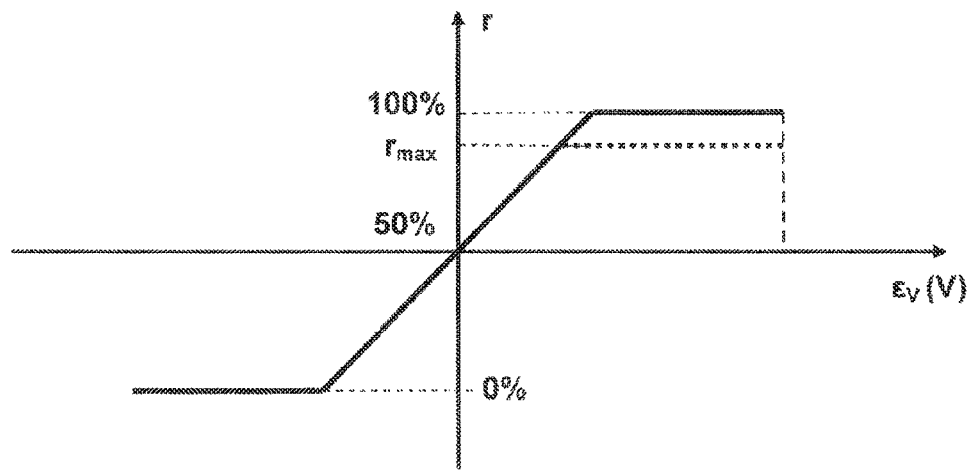

The resulting saturation function is represented in FIG. 3b. The excitation percentage r at the output, which depends on the voltage error $\epsilon_V$ at the input, is at the most equal to the maximum permissible excitation percentage $r_{max}$ supplied by the control module 20.

Figure 4A:
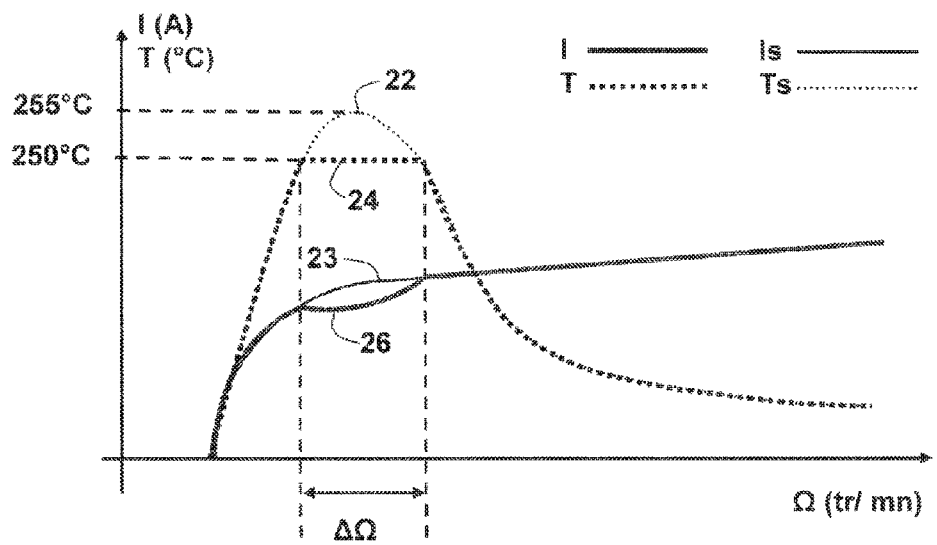
FIG. 4a establishes a comparison between the measurements of flows and temperatures of a standard alternator (thin lines) and a similar alternator provided with a control device according to the invention (thick lines)
Figure 4B:
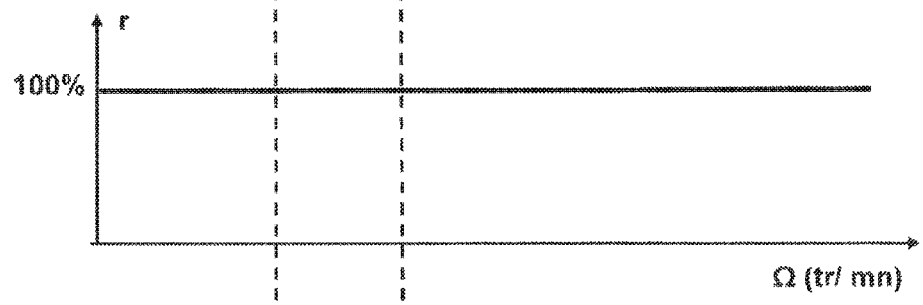
FIGS. 4b and 4c show respectively the maximum permissible excitation percentage for both of these alternators.
Figure 4C:
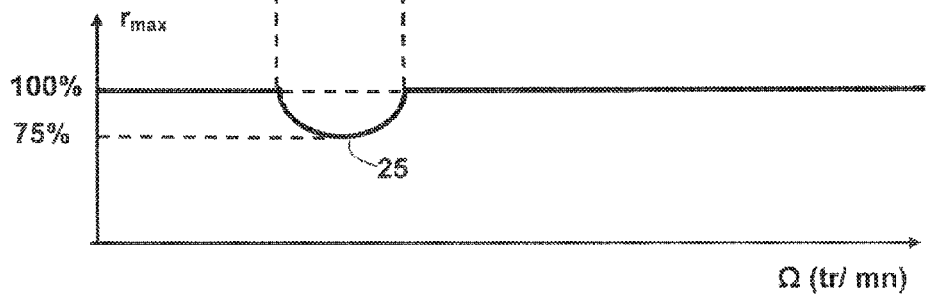

FIGS. 4a, 4b and 4c show the effect of the temperature control loop 17 for an alternator 11 provided with the control device 5 according to the invention, in comparison with a standard alternator with a thermal balance which is critical in a critical speed range ΔΩ without the control device 5 according to the invention.

For the standard alternator, the current temperature Ts (thin broken line) exceeds 250° C., and reaches 255° C. in the critical speed range ΔΩ when the output Is (thin solid line 23) increases according to the speed of rotation Ω as shown clearly in FIG. 4a, when the excitation continues to be "full field" (FIG. 4b).

For the alternator 11 according to the invention, the current temperature T (thick broken line 24) remains lower than 250° C.

As a result of the temperature control, the excitation 25 does not remain "full field" in the critical speed range ΔΩ, but decreases by 25%. The output I (thick solid line 26) of the alternator according to the invention is smaller than the output Is of the standard alternator, but the fact of keeping the alternator 11 below 250° C. makes it possible to preserve the intactness of its components.

In the second preferred embodiment of the invention, the process diagram of which is represented in FIG. 5, the temperature control loop 18 comprises a plurality of temperature sensors which supply a plurality of current temperatures of a plurality of components of the alternator 11:

a first sensor of a first temperature T_s of the stator of the alternator 11;

a second sensor of a second temperature T_Fe of the casing of the alternator 11;

a third sensor of a third temperature T_d of the rear bearing of the alternator 11, i.e. of the phase current rectifier diodes arranged on this bearing;

a fourth sensor of a fourth temperature T_r of the rotor;

a fifth sensor of a fifth temperature of a junction 27 of the semiconductor switch 16.

These first, second, third, fourth and fifth temperatures T_s, T_Fe, T_d, T_r, T_j are subtracted respectively from the first, second, third, fourth and fifth maximum permissible temperatures Th_s, Th_Fe, Th_d, Th_r, Th_j by first, second, third, fourth and fifth second subtracters 28, 29, 30, 31, 32 forming a series of first, second, third, fourth and fifth temperature errors $\epsilon\_s$, $\epsilon\_Fe$, $\epsilon\_d$, $\epsilon\_r$, $\epsilon\_j$.

Means 33 for determination of a maximum error $\epsilon_{max}$ from amongst this series control a selector 34 which supplies this maximum error $\epsilon_{max}$ to the control module 20, in order to determine the maximum permissible excitation percentage $r_{max}$ which, by means of the saturation module 21, limits the excitation percentage r calculated by the voltage control loop 8.

In this second embodiment of the invention, a voltage reference module 35 which can be controlled by the fifth temperature T_j of the junction of the semiconductor switch 16 supplies the set voltage $U_0$ to the voltage control loop 8, by decreasing an initial set voltage to a level of approximately −5 mV/° C.

It will be appreciated that the invention is not limited simply to the preferred embodiments described above.

In particular, the particular values of the temperatures, gradient or levels specified above are given purely by way of examples.

The same applies to the particular components of the alternator 11, stator, casing, bearing, rotor or switch, the current temperatures of which are measured. As a variant, these components could be replaced by other components of the alternator 11, maintenance of which below a predetermined temperature threshold would make it possible to improve the reliability of the alternator 11.

On the contrary, the invention thus incorporates all the possible variant embodiments which would remain within the scope defined by the following claims.

The invention claimed is:

1. Device (5, 6) for controlling a motor vehicle alternator (11) of the type which controls a direct voltage (B+A) generated by said alternator (11) at a predetermined set voltage ($U_0$) by controlling the intensity of an excitation current ($I_{EXC}$) which circulates in an excitation current comprising an excitation winding of a rotor of said alternator (11), and also maintaining at least one current temperature (T) of the components of said alternator (11) below at least one predetermined maximum permissible temperature ($T_{max}$), including a voltage control loop (7, 8) comprising:

means (12) for acquisition of said direct voltage (B+A) which supplies a measured voltage ($U_{b+}$);

a first subtracter (13) of said measured voltage ($U_{b+}$) from said set voltage ($U_0$), which generates an error voltage ($\epsilon_V$);
means (14) for conditioning of said error voltage ($\epsilon_V$);
a saturation module (21) which supplies according to said voltage error ($\epsilon_V$) at the input an excitation percentage (r) at the output which is limited to a maximum permissible excitation percentage ($r_{max}$);
a generator (15) of a pulse width modulated signal (PWM) which has a duty cycle equal to said excitation percentage (r);
a semiconductor switch (16) which is controlled by said pulse width modulated signal (PWM) controlling said intensity ($I_{EXC}$);
and additionally including a temperature control loop (17, 18) comprising:
at least one temperature sensor which supplies at least one current temperature (T) of said components;
at least one second subtracter (19) of the said at least one current temperature (T) from said at least one maximum permissible temperature ($T_{max}$), which generates at least one temperature error ($\epsilon_T$);
a control module (20) which supplies said maximum permissible excitation percentage ($r_{max}$) according to said at least one temperature error ($\epsilon_T$), in accordance with a predetermined control law.

2. Device (5) for controlling a motor vehicle alternator (11) according to claim 1, wherein said at least one current temperature (T) is a current casing temperature of a casing of said alternator (11), or a current bearing temperature of a rear bearing of said alternator (11), or a current junction temperature of a junction (27) of said semiconductor switch (16), and said at least one maximum permissible temperature ($T_{max}$) is a predetermined maximum permissible casing temperature or a predetermined maximum permissible bearing temperature, or a predetermined maximum permissible junction temperature, and said at least one temperature sensor is a casing temperature sensor or a bearing temperature sensor, or a junction temperature sensor.

3. Device (6) for controlling a motor vehicle alternator (11) according to claim 1, wherein said temperature control loop (18) comprises:
a set of sensors formed by a plurality of first examples of said at least one temperature sensor;
a plurality of second examples (28, 29, 30, 31, 32) of said at least one second subtracter (19), generating a series of errors ($\epsilon\_s, \epsilon\_Fe, \epsilon\_d, \epsilon\_r, \epsilon\_j$) formed by a plurality of third examples of said at least one temperature error ($\epsilon_T$), by comparing respectively elements of a set of current temperatures (T_s, T_Fe, T_d, T_r, T_j) supplied by said set of sensors with the elements of a set of maximum permissible temperatures (Th_s, Th_Fe, Th_d, Th_r, Th_j) formed by a plurality of fourth examples of said at least one maximum permissible temperature ($T_{max}$);
means (33) for determining a maximum error ($\epsilon_{max}$) from amongst said series of errors ($\epsilon\_s, \epsilon\_Fe, \epsilon\_d, \epsilon\_r, \epsilon\_j$);
a selector (34) which supplies said maximum error ($\epsilon_{max}$) to said control module (20).

4. Device (6) for controlling a motor vehicle alternator (11) according to claim 3, wherein:
said set of sensors comprises at least a plurality of elements selected from amongst a first sensor of a first temperature (T_s) of a stator of said alternator (11), a second sensor of a second temperature (T_Fe) of a casing of said alternator (11), a third sensor of a third temperature (T_d) of the rectifier diodes of the phase currents of said alternator (11), a fourth sensor of a fourth temperature (T_r) of said rotor, a fifth sensor of a fifth temperature (T_j) of a junction (27) of said semiconductor switch (16);
said set of current temperatures comprises at least a plurality of current values selected from amongst the said first, second, third, fourth and fifth temperatures (T_s, T_Fe, T_d, T_r, T_j);
said set of maximum permissible temperatures comprises at least a plurality of reference values selected from amongst first, second, third, fourth and fifth maximum permissible temperatures (Th_s, Th_Fe, Th_d, Th_r, Th_j) corresponding to said first, second, third, fourth and fifth temperatures (T_s, T_Fe, T_d, T_r, T_j).

5. Device (6) for controlling a motor vehicle alternator (11) according to claim 4, wherein said set voltage ($U_0$) depends on said fifth temperature (T_j).

6. Device (5, 6) for controlling a motor vehicle alternator (11) according to claim 1, wherein said means (14) for conditioning of said voltage error ($\epsilon_V$) comprise means for filtering and adjustment of a gain (k).

7. Device (5, 6) for controlling a motor vehicle alternator (11) according to claim 1, wherein said voltage control loop (7, 8) and said temperature control loop (17, 18) are digital.

8. Device (5, 6) for controlling a motor vehicle alternator (11) according to claim 1, wherein it forms a monolithic assembly which incorporates said semiconductor switch (16).

9. Device (5, 6) for controlling a motor vehicle alternator (11) according to claim 1, wherein said predetermined control law has a gradient of approximately −5%/° C. between −20° C. and 0° C.

10. Motor vehicle alternator (11) comprising a control device (5,6) according to claim 1.

11. Device (5, 6) for controlling a motor vehicle alternator (11) according to claim 2, wherein said means (14) for conditioning of said voltage error ($\epsilon_V$) comprise means for filtering and adjustment of a gain (k).

12. Device (5, 6) for controlling a motor vehicle alternator (11) according to claim 3, wherein said means (14) for conditioning of said voltage error ($\epsilon_V$) comprise means for filtering and adjustment of a gain (k).

13. Device (5, 6) for controlling a motor vehicle alternator (11) according to claim 4, wherein said means (14) for conditioning of said voltage error ($\epsilon_V$) comprise means for filtering and adjustment of a gain (k).

14. Device (5, 6) for controlling a motor vehicle alternator (11) according to claim 5, wherein said means (14) for conditioning of said voltage error ($\epsilon_V$) comprise means for filtering and adjustment of a gain (k).

15. Device (5, 6) for controlling a motor vehicle alternator (11) according to claim 2, wherein said voltage control loop (7, 8) and said temperature control loop (17, 18) are digital.

16. Device (5, 6) for controlling a motor vehicle alternator (11) according to claim 3, wherein said voltage control loop (7, 8) and said temperature control loop (17, 18) are digital.

17. Device (5, 6) for controlling a motor vehicle alternator (11) according to claim 4, wherein said voltage control loop (7, 8) and said temperature control loop (17, 18) are digital.

18. Device (5, 6) for controlling a motor vehicle alternator (11) according to claim 5, wherein said voltage control loop (7, 8) and said temperature control loop (17, 18) are digital.

19. Device (5, 6) for controlling a motor vehicle alternator (11) according to claim 6, wherein said voltage control loop (7, 8) and said temperature control loop (17, 18) are digital.

* * * * *